United States Patent [19]

Signorini et al.

[11] Patent Number: 5,296,104
[45] Date of Patent: Mar. 22, 1994

[54] PROCESS FOR OBTAINING PURIFIED AQUEOUS HYDROGEN PEROXIDE SOLUTIONS

[75] Inventors: Lido Signorini; Konstantin Glinos, both of Brussels, Belgium

[73] Assignee: Interox International (Societe Anonyme), Brussels, Belgium

[21] Appl. No.: 932,591

[22] Filed: Aug. 20, 1992

[30] Foreign Application Priority Data

Aug. 27, 1991 [BE] Belgium ............................. 09100787

[51] Int. Cl.$^5$ .............................................. B01D 3/14
[52] U.S. Cl. ...................................... 203/83; 203/12; 203/96; 203/DIG. 19; 202/153; 202/158; 423/588
[58] Field of Search ................ 203/42, 98, 83, 95, 203/DIG. 19, 96, DIG. 9; 202/158, 153, 184, 183; 423/584–591

[56] References Cited

U.S. PATENT DOCUMENTS

| 358,196 | 2/1887 | Gruneberg et al. | 202/153 |
| 3,094,401 | 6/1963 | Lidell | 202/158 |
| 3,152,052 | 10/1964 | Jenney et al. | |
| 3,714,342 | 1/1973 | Kabisch | 423/588 |
| 5,171,407 | 12/1992 | Meili | 423/584 |

FOREIGN PATENT DOCUMENTS

| 362060 | 7/1962 | Switzerland . | |
| 2202 | of 1861 | United Kingdom | 202/158 |
| 452632 | 8/1936 | United Kingdom . | |
| 811050 | 3/1959 | United Kingdom | 423/584 |

Primary Examiner—Wilbur Bascomb, Jr.
Attorney, Agent, or Firm—Oblon, Spivak, McClelland, Maier & Neustadt

[57] ABSTRACT

Process for obtaining purified hydrogen peroxide solutions, consisting in evaporating the crude aqueous hydrogen peroxide solution containing the impurities and feeding by means of the vapour phase produced the foot of a distillation column provided in its lower part with a zone for washing the vapour phase with a small flow of liquid which refluxes in the bottom of the column and which has the same composition as the purified aqueous hydrogen peroxide solution forming the product leaving the column, in drawing off this purified product at a column height such that the draw-off is carried out above the vapour phase washing zone and in collecting at the bottom of the column a residue consisting of the small flow of washing liquid which contains most of the impurities. The washing zone has a diameter which is greater than that of the remainder of the column.

Distillation column for carrying out the process.

13 Claims, 1 Drawing Sheet

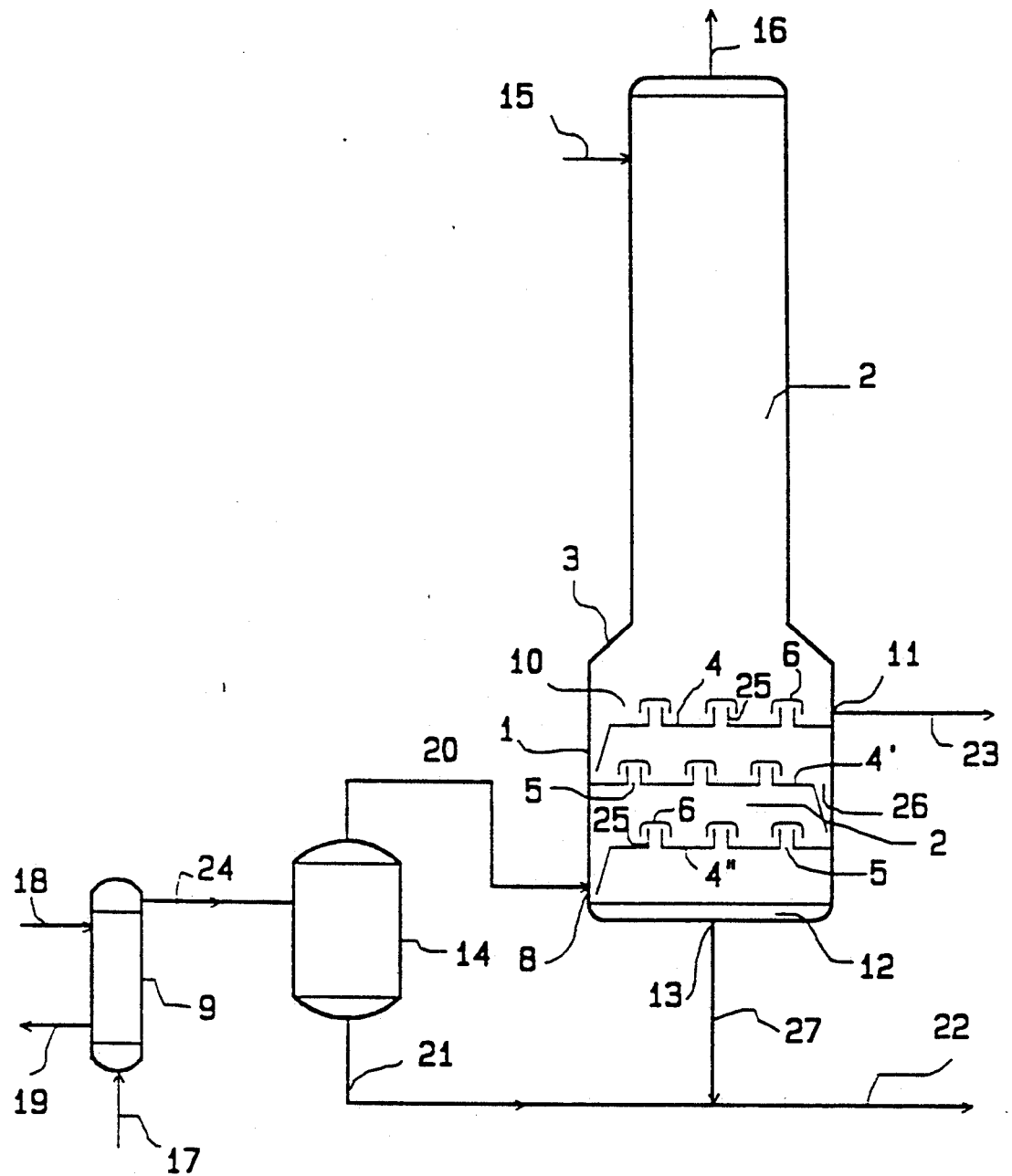

PROCESS FOR OBTAINING PURIFIED AQUEOUS HYDROGEN PEROXIDE SOLUTIONS

The invention relates to a process for obtaining concentrated aqueous hydrogen peroxide solutions with low contents of impurities.

It also relates to a distillation column for obtaining concentrated aqueous hydrogen peroxide solutions which are purified from impurities.

There is a known process (FMC Corporation U.S. Pat. No. 3,152,052) for concentrating and purifying aqueous hydrogen peroxide solution which is produced in a process using alkylanthraquinones, according to which a major part of the aqueous solution of hydrogen peroxide containing organic impurities is vaporised, a residue which is concentrated in impurities is continually drawn off from the mixture at boiling temperature in the evaporator, the vapour is subjected to distillation in a first distillation column, at the top of which water vapour is collected and at the foot of which a purified aqueous hydrogen peroxide solution is collected, the residue which is concentrated in impurities is treated in a second column where stripping of the residue is carried out with the vapour produced at the top of the first column, and a final residue containing most of the impurities is collected at the foot of the second column and is then thrown away.

However, this known process has the disadvantage of giving rise to solutions in which the simultaneous concentrations of $H_2O_2$ and of organic materials are such that they sometimes lie in the explosion hazard region or are very close to this region. Furthermore, the treatment of the aqueous hydrogen peroxide solutions in two successive distillation columns is frequently the cause of a significant loss of a substantial part of hydrogen peroxide by decomposition into oxygen and water.

The invention is aimed at overcoming the disadvantages of the known processes by providing a process which produces a concentrated aqueous hydrogen peroxide solution which is purified from organic and inorganic materials and which does not involve dangerous concentrations of hydrogen peroxide and of organic materials, while avoiding the losses of peroxide by decomposition.

To this end, the invention relates to a process for obtaining purified aqueous hydrogen peroxide solutions providing concentrated aqueous hydrogen peroxide solutions with a reduced content of impurities, according to which a major part of a crude aqueous hydrogen peroxide solution containing organic and/or inorganic impurities is evaporated to obtain a vapour phase consisting of a mixture of water and hydrogen peroxide, which also contains the volatile impurities and those which have been entrained with the said vapour phase, and according to which this vapour phase is rectified to produce an aqueous hydrogen peroxide solution depleted in impurities. According to the invention, the said vapour phase is fed in at the foot of a distillation column provided in its lower part with a washing zone where the vapour phase is washed with a small flow of liquid which refluxes in the bottom of the column and which has the same composition as the purified aqueous hydrogen peroxide solution forming the product leaving the column, this purified product is drawn off at the side at a column height such that the draw-off takes place above said washing zone of said vapour phase and a residue consisting of the small flow of washing liquid, which contains most of the impurities, is collected at the bottom of the column. According to the invention the washing zone of the distillation column has a column diameter which is greater than the diameter of the rectification section.

The process according to the invention is suitable for purifying crude aqueous hydrogen peroxide solutions obtained by the process using alkylanthraquinones.

The process using alkylanthraquinones is intended to denote a process for the production of a concentrated aqueous hydrogen peroxide solution consisting in hydrogenating an organic working solution of at least one alkylanthraquinone and/or of at least one tetrahydroalkylanthraquinone to produce one or a number of alkylated anthrahydroquinones and/or tetrahydroanthrahydroquinones. The working solution containing the solution of alkylated (tetrahydro)anthrahydroquinones is then subjected to oxidation by means of oxygen, air or oxygen-enriched air, to yield hydrogen peroxide and to re-form the alkylated alkylanthraquinones and/or tetrahydroanthraquinones. The hydrogen peroxide formed is then separated from the organic working solution by means of a water extraction stage, the hydrogen peroxide being recovered in the aqueous phase. The organic working solution containing the (tetrahydro)alkylanthraquinones is then recycled to the hydrogenation stage in order to recommence the hydrogen peroxide production cycle.

Alkylanthraquinones are intended to denote 9,10-anthraquinones substituted in position 1, 2 or 3 by at least one alkyl side chain of linear or branched aliphatic type, containing at least one carbon atom. These alkyl chains usually contain fewer than 9 carbon atoms and, preferably, fewer than 6 carbon atoms. Examples of such alkylanthraquinones are 2-ethylanthraquinone, 2-isopropylanthraquinone, 2-sec- and 2-tert-butylanthraquinones, 1,3-, 2,3-, 1,4- and 2,7-dimethylanthraquinones, 2-iso- and 2-tert-amylanthraquinones and mixtures of these quinones.

Alkylated anthrahydroquinones are intended to denote the 9,10-hydroquinones corresponding to the 9,10-alkylanthraquinones as clarified above.

The process according to the invention is also suitable for purifying the crude aqueous hydrogen peroxide solutions which are produced by other known techniques. For example, it can be employed for purifying aqueous $H_2O_2$ solutions originating from a direct synthesis from hydrogen and oxygen. It can also be applied to the purification of $H_2O_2$ solutions obtained by an electrolytic process.

The objective of the process according to the invention is to provide aqueous solutions which are concentrated in hydrogen peroxide with a reduced content of impurities. It is well-suited for obtaining aqueous solutions with reduced contents of organic materials, that is to say containing less than 60 ppm of organic materials and preferably less than 30 ppm. The proces is also well-suited for reducing the content of inorganic impurities in aqueous hydrogen peroxide solutions. It is possible, for example, to use it to reduce the content of inorganic materials to a value comparable with that of the organic materials or even, in some cases, to values below that of the organic materials.

The aqueous hydrogen peroxide solution to be purified may generally still contain a significant quantity of organic impurities such as oxidation products of the quinones and organic solvents. The quantity of organic impurities, expressed in the form of total organic carbon (TOC) in this aqueous hydrogen peroxide solution is often higher than 150 ppm. Furthermore, it is generally lower than 700 ppm. As for the inorganic impurity content of this solution, this is generally between 100 and 500 ppm.

The process according to the invention is well-suited for purifying crude aqueous hydrogen peroxide solutions in which the $H_2O_2$ concentration is higher than 20% by weight and, more often, higher than 30%. It is also well-suited for the purification of crude aqueous hydrogen peroxide solutions in which the $H_2O_2$ concentration does not exceed 60%, and, in most cases, 50%.

The purified aqueous hydrogen peroxide solutions produced by means of the process according to the invention generally have an $H_2O_2$ concentration of more than 50% by weight, and, in most cases, of more than 60%. Similarly, these purified solutions generally contain less than 80% by weight of $H_2O_2$ and, in most cases, less than 75%.

According to the process in accordance with the invention, after evaporation of a major part of the crude hydrogen peroxide solution containing the impurities, a vapour phase consisting of a mixture of water and $H_2O_2$ still containing a certain quantity of volatile impurities and of impurities entrained with the vapour phase, and a residual liquid concentrated in organic and inorganic impurities are obtained. The vapour phase obtained represents at least 70% and in most cases approximately 80 to 90% of the total quantity of $H_2O_2$ present in the solution to be evaporated. The quantity of organic impurities in the vapour phase which is formed is generally greater than 50 ppm and smaller than 300 ppm, expressed as total organic carbon (TOC) and, in most cases, greater than 100 ppm and smaller than 200 ppm. The quantity of inorganic impurities entrained with the vapour phase is usually from approximately 30 to approximately 200 ppm.

Between the evaporator of the crude hydrogen peroxide solution to be purified and the distillation column there is generally to be found a separator, the purpose of which is to remove the liquid which has not been evaporated from the vapour phase used to feed the distillation column.

According to the invention the vapour phase produced in the evaporator for the aqueous hydrogen peroxide solution containing the impurities is rectified in a distillation column operating as a concentration column and provided in its lower part with a number of trays for washing the vapour phase which is introduced. The purpose of these trays is to carry out a washing of the vapour phase by means of a small flow of liquid refluxing in the column in order to rid the vapour phase of the organic and inorganic impurities which it contains. According to the invention the liquid which refluxes in the column and which is used to wash the vapour phase has the same composition as the side draw-off (purified aqueous hydrogen peroxide solution forming the product leaving the column). Its flow rate, which is also the flow rate of the residue collected at the foot of the column, is such that it usually contains approximately 5% by weight of the $H_2O_2$ flow present in the feed (crude aqueous solution to be purified entering the distillation unit).

The part of the distillation column in accordance with the process according to the invention which is situated above the washing zone is generally called a rectification section and its purpose is to concentrate the hydrogen peroxide solution. In this section a distillate containing most of the volatile impurities and escaping at the top of the column is separated from a side draw-off taken at the bottom of this rectification section and forming the output of concentrated and purified aqueous hydrogen peroxide. Preferably, this distillation column can be operated under reduced pressure. In general, the pressure is lower than 100 kPa. A pressure of approximately 5 to 5.5 kPa is generally suitable. The rectification section of the column is filled with an appropriate number of fractionating devices. The latter may be chosen from the various fractionating devices which are known per se in the technology of distillation columns, such as, for example, perforated trays, valve trays, bubble cap trays and various packings such as, for example, Raschig rings, Pall rings and woven mats. Perforated trays and packings are preferred.

A reflux must be ensured at the top of the rectification section so that liquid is obtained on all the fractionating devices. This reflux may be carried out by condensing the vapour escaping at the top of the column and recycling a part of the liquid formed on the first fractionating device. It can preferably also consist of an addition of demineralised water, so as not to recirculate the volatile impurities present in the vapour.

In order to conform to the process of the invention it is also advisable that the side draw-off of the purified hydrogen peroxide solution from the distillation column should take place at a column height such that this draw-off takes place above the vapour phase washing zone. For example, the purified $H_2O_2$ solution can be drawn off at a place situated a few centimeters above the highest tray of the vapour phase washing zone. In a preferred alternative form, the draw-off can be performed at a level situated between the upper tray of the vapour phase washing zone and the lower fractionating device of the rectification section of the column, for example the lower fractionating tray.

In accordance with the invention a residue consisting of the stripping liquid is collected at the bottom of the distillation column. This residue forms the purge leaving the distillation unit. This has a $H_2O_2$ content of approximately 70% by weight, corresponding to approximately 5% by weight of the total quantity of hydrogen peroxide contained in the feed entering the distillation column and contains the major part of the impurities. The quantity of impurities in the purge is generally greater than 500 and sometimes greater than 1000 ppm of organic and/or inorganic materials.

The distillation column in accordance with the process according to the invention has, in its lower part, a washing zone of the vapour phase feed to be purified which is injected into the bottom of the column. This washing zone can be constructed by any technique which is suitable and known per se for carrying out washing of a gas by a liquid. The technique of washing the vapour phase with a refluxing liquid on trays which are arranged one above the other has been found to be highly suitable for the purification of the vapour phase of hydrogen peroxide containing organic and inorganic impurities.

The washing trays arranged in the bottom of the distillation column which are chosen will preferably be of the bubble-cap type, to avoid the phenomenon of "weeping" of the liquid from one tray to another and to minimise the entrainment of droplets of liquid by the rising vapour towards the upper tray.

The washing zone of the distillation column according to the process in accordance with the invention comprises at least one washing tray. Frequently, not more than 4 trays are employed. In the particular cases where the aqueous hydrogen peroxide solution to be purified contains few impurities, such as, for example, solutions containing less than 80 ppm of organic materials, a washing zone comprising only two trays or even a single tray can sometimes be found sufficient. In most cases, this washing zone comprises fewer than 5 trays, that is to say usually 3 or 4 trays.

According to the invention the washing zone is constructed in the bottom of the column with a diameter which is greater than that of the rectification section above the washing zone. The ratio of the diameter of the washing zone to the diameter of the rectification section is generally greater than 1 and frequently chosen to be equal to approximately 1.3 or more. This ratio usually does not exceed approximately 1.8. A ratio of approximately 1.5 has given excellent results.

According to an alternative form of the process according to the invention the operation of evaporation of the crude aqueous hydrogen peroxide solution containing the impurities is preceded by one or more stages of washing of this solution with a water-immiscible organic solvent. The organic solvent may be a polar solvent such as, for example, an alcohol or a mixture of alcohols, an amide or an alkyl phosphate or a nonpolar solvent such as, for example, a hydrocarbon or a mixture of aliphatic and/or aromatic hydrocarbons. It is advantageous to choose as solvent a mixture of at least one polar solvent with at least one nonpolar solvent, in various proportions which depend on the particular nature of the solution to be treated, with a view to being able to extract the organic impurities. It is possible, for example, to choose a mixture of solvents containing a proportion of approximately 50% by weight of one or a number of polar solvents such as diisobutylcarbinol and of approximately 50% of one or a number of nonpolar solvents, such as the solvent marketed under the registered mark Solvesso.

In another alternative form of the process according to the invention, which is preferred, the residue consisting of the small flow of washing liquid leaving the foot of the distillation column is subjected to a purification treatment intended to permit the recycling and the recovery of the products which it contains, in particular of hydrogen peroxide.

The invention also relates to a distillation column which is suitable for carrying out the process according to the invention.

According to the invention the distillation column for carrying out the purification process in accordance with the invention comprises a lower part forming the vapour phase washing zone, whose diameter is from approximately 1.3 to approximately 1.8 times greater than the rectification section of the column and comprises washing trays pierced with orifices fitted with bubble caps, the bottom of this column being provided with a device for entry and distribution of the vapour phase feed to be purified, originating from the evaporator, the top of the washing zone comprising a side draw-off device for the purified aqueous hydrogen peroxide solution produced and the foot of the column being provided with a system intended to collect the residue consisting of the small flow of washing liquid enriched in impurities, with a view to its removal from the distillation unit.

Furthermore the distillation column is detailed more clearly in the description which follows and which refers to the single figure of the attached drawing giving a diagrammatic representation of a preferred embodiment of the distillation column according to the invention.

This distillation column forms an integral part of a distillation unit comprising three devices, namely, the evaporator 9, the separator 14 and the actual distillation column 3. The aqueous hydrogen peroxide solution to be purified, originating from the hydrogen peroxide manufacturing unit and more particularly from the extraction unit (in the case of an alkylanthraquinone process) and which may have undergone at least one previous washing with a mixture of solvents, preferably a mixture of polar and nonpolar solvents, enters the distillation unit via the conduit 17 and enters the evaporator 9 fed with heating steam via steam inlet 18 and steam outlet 19 conduits. The mixture of vapour phase and of liquid produced escapes from the evaporator via the conduit 24 and then enters the separator 14, where it is separated into a vapour phase stream 20 containing water, hydrogen peroxide and impurities, and a liquid stream 21 which leaves the distillation unit.

The vapour phase feed stream 20 to be purified is introduced into the washing zone 1, consisting of the lower part of a distillation column 3, by means of an entry device 8. The distillation column 3 is also fed at its top with a stream of pure water 15 which is used to create a liquid reflux flow passing through the column countercurrentwise to the vapour. The latter escapes at the top of the column via the conduit 16 and leaves the distillation unit. The washing zone 1 of the column is constructed with a diameter which is approximately 1.5 times greater than that of the rectification section 2. In the upper part of the washing zone 1 a flow of purified product, which also leaves the distillation unit, is drawn off sideways at 11 via the conduit 23.

The washing zone 1 of the column is provided with three washing trays 4, 4' and 4". The orifices 5 of these trays are provided with bubble caps 6 placed on top of short pipes 25, the purpose of which is to retain liquid on the tray and to provide a passage for the rising vapour phase. On a part of their circumference, the trays 4, 4' and 4" have apertures 26 intended for the flow of the washing liquid towards the lower tray. On each tray these apertures are arranged in a place which is diametrically opposed to that of the upper tray, so as to force the liquid to cross the whole surface of each washing tray. The upper washing tray 4 is arranged under the side draw-off device 11. As a result of its origin, the liquid product drawn off via the pipework 23 therefore has the same composition as the washing liquid refluxing on the tray 4.

At the base of the wider washing zone 1 of the column there is to be found a device 12 intended to collect the residue consisting of the small flow of washing liquid laden with impurities, which flows via the orifice 13 into the pipework 27 and is removed from the distillation unit via the pipework 22 at the same time as the liquid leaving the separator 14 via the route 21. The continuous presence of a quantity of liquid on the upper tray 4 of the washing zone 1 can be regulated by making the control of a valve placed in the side draw-off stream 23 subject to the measurement of the flow rate of residue which flows out at the foot of column 13.

What is claimed is:

1. A process for obtaining purified aqueous hydrogen peroxide solutions, providing concentrated aqueous hydrogen peroxide solutions with a reduced content of impurities, comprising evaporating a crude aqueous hydrogen peroxide solution containing organic and/or inorganic impurities to obtain a vapour phase consisting of a mixture of water, hydrogen peroxide, volatile impurities and impurities which have been entrained with said vapour phase, and rectifying this vapour phase to produce an aqueous hydrogen peroxide solution depleted in impurities, wherein said vapour phase is fed in at the foot of a distillation column provided in its lower part with a washing zone and in its upper part with a rectification section, where the vapour phase is washed in the washing zone with a small flow of liquid which refluxes in the bottom of the column and which has the same composition as the product purified aqueous hydrogen peroxide solution, and where purified aqueous hydrogen peroxide solution is drawn off at a side of the distillation column at a column height such that the draw-off takes place in the upper part of said washing zone and wherein a residue consisting of a small flow of washing liquid, which contains most of the impurities, is collected at and removed from the bottom of the column, further wherein the washing zone of the distillation column has a column diameter which is greater than the diameter of the rectification section.

2. A process according to claim 1, wherein the washing zone contains from 1 to 4 trays.

3. A process according to claim 2, wherein the washing zone contains 1 to 2 trays.

4. A process according to claim 2, wherein the washing zone contains 3 or 4 trays.

5. A process according to any one of claims 2 to 4, wherein the washing trays are provided with orifices on top of which are bubble-caps.

6. A process according to any one of claims 1 to 4, wherein the ratio of the diameter of the washing zone to that of the rectification section is between approximately 1.3 and approximately 1.8.

7. A process according to claim 6, wherein the ratio of the diameter of the washing zone to that of the rectification section is equal to approximately 1.5.

8. A process according to any one of claims 1 to 4, wherein the evaporation of the crude aqueous hydrogen peroxide solution is preceded by at least one stage of washing said crude solution with an organic solvent.

9. A process according to any one of claims 1 to 4, wherein the washing liquid leaving the bottom of the distillation column is subjected to a purification treatment.

10. A process according to claim 5, wherein the ratio of the diameter of the washing zone to that of the rectification section is between approximately 1.3 and approximately 1.8.

11. A process according to claim 5, wherein the ratio of the diameter of the washing zone to that of the rectification section is equal to approximately 1.5.

12. A process as claimed in any one of claims 1 to 4, wherein said crude aqueous hydrogen peroxide solution is obtained by the alkyl anthraquinone process.

13. A process according to any one of claims 1 to 4, wherein said washing zone and said rectification section in said distillation column are disposed one above the other along the same axis.

* * * * *